US008862626B2

(12) United States Patent
Kellermann et al.

(10) Patent No.: US 8,862,626 B2
(45) Date of Patent: Oct. 14, 2014

(54) TEXT-BASED INFORMATION TRANSMISSION

(75) Inventors: Christian Kellermann, Nuremberg (DE); Bernd Linz, Erlangen (DE); Markus Prosch, Erlangen (DE); Alexander Zink, Stegaurach (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 148 days.

(21) Appl. No.: 13/273,662

(22) Filed: Oct. 14, 2011

(65) Prior Publication Data

US 2012/0124095 A1    May 17, 2012

Related U.S. Application Data

(63) Continuation of application No. PCT/EP2010/054728, filed on Apr. 9, 2010.

(30) Foreign Application Priority Data

Apr. 14, 2009    (EP) .................................... 09005331

(51) Int. Cl.
*G06F 17/30*    (2006.01)
*H04N 21/8352*    (2011.01)
*H04N 21/8543*    (2011.01)
*H04N 21/482*    (2011.01)
*H04N 21/854*    (2011.01)
*H04N 21/475*    (2011.01)

(52) U.S. Cl.
CPC ..... *H04N 21/85406* (2013.01); *H04N 21/8352* (2013.01); *H04N 21/8543* (2013.01); *H04N 21/4828* (2013.01); *H04N 21/4755* (2013.01)
USPC ........... 707/792; 707/795; 707/796; 707/804; 707/805; 707/806

(58) Field of Classification Search
CPC ............ G06F 17/2229; G06F 17/2247; G06F 17/30017; G06F 17/30073; G06F 17/30144
USPC ......... 707/792, 795, 796, 804, 805, 806, 807, 707/810, 811; 709/217
See application file for complete search history.

(56) References Cited

U.S. PATENT DOCUMENTS 6,981,214 B1 * 12/2005 Miller et al. ................... 715/234
2004/0186741 A1 * 9/2004 Sawada ............................ 705/1
(Continued)

FOREIGN PATENT DOCUMENTS

EP    2210168    7/2010
JP    2004186741    7/2004
(Continued)

OTHER PUBLICATIONS

Okada, et al., "Implementation and evaluation of an on-device customizable user interface for smart devices", Computer and Information Technology, 2008. CIT 2008. 8th IEEE International Conference on, IEEE, Piscataway, NJ, USA, XP031302626; ISBN: 978-1-4244-2357-6; Section 2 Hyperlink-base customizable user interface framework, 412412006, 231-236.*

(Continued)

*Primary Examiner* — Khanh Pham
*Assistant Examiner* — Ahmed Abraham
(74) *Attorney, Agent, or Firm* — Michael A. Glenn; Perkins Coie LLP

(57) ABSTRACT

The navigation overhead and/or the content managing/updating overhead is reduced by providing link objects with condition data being associated with the link items of the link objects so that, depending on a check as to whether the condition data is fulfilled or not, an automatic handling of a link object may be performed. For example, the automatic handling may have an automatic appointing an object ID referred to by a link item of the link object that has condition data associated therewith which is fulfilled, as a newly-selected object ID.

16 Claims, 7 Drawing Sheets

(56) References Cited

U.S. PATENT DOCUMENTS

| | | | |
|---|---|---|---|
| 2006/0059182 A1* | 3/2006 | Blair-Stanek | 707/101 |
| 2007/0050468 A1* | 3/2007 | Gazit | 709/217 |
| 2008/0033741 A1* | 2/2008 | Van Luchene et al. | 705/1 |
| 2009/0113346 A1* | 4/2009 | Wickramasuriya et al. | 715/825 |
| 2009/0300598 A1* | 12/2009 | Choi | 717/173 |
| 2010/0257568 A1* | 10/2010 | Woo | 725/87 |
| 2012/0124160 A1* | 5/2012 | Shon | 709/217 |

FOREIGN PATENT DOCUMENTS

| | | |
|---|---|---|
| JP | 2008033741 | 2/2008 |
| WO | 2009058505 | 5/2009 |

OTHER PUBLICATIONS

Stefano Ceri, Florian Daniel, Maristella Matera "Extending WebML for Modeling Multi-Channel Context-Aware Web Applications" Dipartimento di Elettronica—Politecnico di Milano Rzza Leonardo da Vinci, 32—20133—Milano, Italy, 2004.*

Ceri et al. "Extending WebML for modeling multi-channel context-aware web applications", WEB Information Systems Engineering Workshops, 2003. Proceedings. 4th International Conference on Rome, Italy, Dec. 13, 2003. Piscataway, N J, USA, IEEE, XP 010697509; ISBN: 978-0-7695-2103-9; Section 5 WebML and context-awareness, 111/2003, 225-233.*

Ceri, et al., "Extending WebML for modeling multi-channel context-aware web applications", WEB Information Systems Engineering Workshops, 2003. Proceedings. 4th International Conference on Rome, Italy, Dec. 13, 2003. Piscataway, NJ, USA, IEEE, XP 010697509; ISBN: 978-0-7695-2103-9; Section 5 WebML and context-awareness, Jan. 1, 2003, 225-233.

Nakamoto, et al., "Design of a Hyperlink-based Software Architecture for Smart Devices", Object and Component-Oriented Real-Time Ninth IEEE International Symposium on Gyeongju, Korea Apr. 24-26, 2006, Piscataway, NJ, USA, IEEE, XP01096569, ISBN: 978-0-7695-2561-7, Section 3—Hyperlink-based Softwa, Apr. 24, 2006, 261-268.

Okada, et al., "Implementation and evaluation of an on-device customizable user interface for smart devices", Computer and Information Technology, 2008. CIT 2008. 8th IEEEE International Conference on, IEEE, Piscataway, NJ, USA, XP031302626; ISBN: 978-1-4244-2357-6; Section 2 Hyperlink-base customizable user interface framework, Apr. 24, 2006, 231-236.

Lopez-Nores, M. et al., "Downsizing Semantic Reasoning to Fixed and Mobile DTV Receivers", Semantic Media Adaptation and Personalization, Second International Workshop on, IEEE, PI, XP031199154, ISBN: 978-0-7695-3040-6, Dec. 1, 2007, pp. 153-158.

O'Keeffe, I. et al., "A Unified Approach to Adaptive Hypermedia Personalisation and Adaptive Service Composition", Adaptive Hypermedia and Adaptive Web-Based Systems Lecture Notes in Computer Science; LNCS, Springer, Berlin, DE, XP019034552, ISBN: 978-3-540-34696-8, Jan. 1, 2006, pp. 303-307.

* cited by examiner

TEXT-BASED INFORMATION TRANSMISSION

CROSS-REFERENCE TO RELATED APPLICATIONS

This application is a continuation of copending International Application No. PCT/EP2010/054728, filed Apr. 9, 2010, which is incorporated herein by reference in its entirety, and additionally claims priority from European Application No. EP 09005331.5, filed Apr. 14, 2009, all of which are incorporated herein by reference in their entirety.

BACKGROUND OF THE INVENTION

The present application relates to text-based information transmission such as, for example, data-carousel text-based information broadcasting an example for which is the XML-based low-profile information service Journaline®.

Data carousel text-based information broadcasting being representative of a text-based information transmission, enables text-based information to be distributed to a huge amount of users with keeping the technical overhead reasonably low. For example, no uplink or feedback signals from the receivers to the broadcast transmitter is needed. In order to enable the users to individually navigate through the information content provided by the broadcast signal according to their personal preferences, the whole information is divided-up into objects referring to other objects, thereby enabling interactively navigating to the resulting linked arrangement of objects. To be more precise, menu objects enable the user to select, among menu items, in order to proceed from one object to the other.

Although it would be possible to provide each object with a parent object ID in order to enable the user to move from this object to its parent object by pressing, for example, a respective return button, the provision of such a parent link is not provided in any data carousel broadcast system or is not even worthwhile due to fact that more than one menu object may forward-link to an object so that a preset parent object ID pointer would not allow for an intuitive return action. In the NewsService Journaline, the objects are arranged in a hierarchal tree structure with links leading from the route object to any other object extend via link items of objects such as the menu items of menu objects or the interactivity features links of objects, the link item pointing to another such as, for example, hierarchically subordinate, object.

Taking the above properties of data carousel text-based information broadcasting systems into account, it becomes clear that the navigation through the respective tree structure of text-based information objects may be cumbersome for the users, or that an updating of the information content broadcasted by the broadcast signal may be limited. For example, in order to render the information broadcasted available for users of different languages, the text-based information tree structure may be provided in the form of a forest of disjoint rooted trees, with each receiver being configured to start the navigation through the respective rooted tree structure or being configurable to start navigation at a selectable one of these rooted tree structures. New languages may be accommodated by new trees with new tree roots. However, the necessity of configuring the receiver is sometimes unwanted due to the related overhead in providing the user with the ability of configuring the receiver. In auto radios, for example, the number of input switches may be highly restricted so that a configuration of the radio to a new root object ID associated with a newly supported service language would be too cumbersome. Another possibility is to configure all receivers to start navigation at a common root menu object, with this root menu object providing the user with the ability of selecting a language so that each language would correspond to a respective sub-tree of the whole tree and adding a new language would merely necessitate adding a menu item to the root menu object pointing to the new tree of objects concerning the newly supported language. However, even this possibility would necessitate the user having to select the language first in order to navigate through the actual information in his/her language.

Another problem stemming from the above-mentioned properties of data carousel text-based information broadcasting, which the broadcaster faces, is the broadcaster's necessity of continuously updating the text information objects in order to keep the information contained therein up-to-date. Some information presented in the data carousel is of temporary validity only. In other words, this information should be broadcasted merely for a limited time duration with assigning the object ID to another information content upon expiration of the respective time duration. Even other information, however, is relevant for a longer time in a periodic manner. For example, some object IDs could be reserved for presenting information on birthdays of famous persons to the user and the names of persons for a specific date would get relevant on a year-by-year basis with the information broadcaster having to update the content associated with that object ID each day.

Further, data carousel text-based information broadcasting signals are not restricted to textual information alone. For example, some objects may contain additional data, which is to be disregarded by low-profile receivers, with this additional data being dedicated for high-level receivers capable of handling this additional information such as data pertaining special symbols, graphics, location information or the like. In some cases, it would be a waste of time for a user having a low-level receiver to visit a certain object due to their main content relying on this additional data rather than pure text data. This, in turn, increases the navigation overhead for the user.

SUMMARY

According to an embodiment, a receiver for a text-based information signal carrying text-based information content being divided onto information objects, wherein the receiver is a broadcast receiver and the text-based information signal is a data carousel text-based information broadcast signal in which the information objects are broadcasted in a data carousel manner, wherein the receiver may have a user-operable selector; and a processor configured to analyze an information object having a selected object ID among a plurality of unique object IDs, by determining as to whether the information object analyzed is an automatic-handling supporting link object having link items pointing to other object IDs among the plurality of unique object IDs; if so, checking as to whether condition data associated with the link items of the automatic-handling supporting link object is fulfilled; and automatically appointing an object ID referred to by a link item of the automatic-handling supporting link object having condition data associated therewith which is fulfilled, as a newly-selected object ID or rendering a presentation to be presented to the user, representing the automatic-handling supporting link object in a way depending on the check and appointing an object ID referred to by a link item of the automatic-handling supporting link object selected by the user via the user-operable selector, as the newly-selected object ID.

According to another embodiment, a receiver for a text-based information signal carrying text-based information content being divided onto information objects may have a user-operable selector; and a processor configured to analyze an information object having a selected object ID among a plurality of unique object IDs, by determining as to whether the information object analyzed is an automatic-handling supporting link object having link items pointing to other object IDs among the plurality of unique object IDs; if so, checking as to whether condition data associated with the link items of the automatic-handling supporting link object is fulfilled; and automatically appointing an object ID referred to by a link item of the automatic-handling supporting link object having condition data associated therewith which is fulfilled, as a newly-selected object ID or rendering a presentation to be presented to the user, representing the automatic-handling supporting link object in a way depending on the check and appointing an object ID referred to by a link item of the automatic-handling supporting link object selected by the user via the user-operable selector, as the newly-selected object ID, wherein the processor is further configured to, in analyzing the information object having the selected object ID, determine whether none of the link items of the automatically-handling supporting link object has associated therewith a condition data being fulfilled; and if so, check default signaling of the link items of the automatically-handling supporting link object to determine a link object among the link objects of the automatically-handling supporting link object determined by default and automatically appointing an object ID referred to by the link item determined by default as the newly-selected object ID or rendering the presentation to be presented to the user so that the link item determined by default is easier to recognize for the user than link items of the automatically-handling supporting link object not being determined by default.

According to another embodiment, a receiver for a text-based information signal carrying text-based information content being divided onto information objects may have a user-operable selector; and a processor configured to analyze an information object having a selected object ID among a plurality of unique object IDs, by determining as to whether the information object analyzed is an automatic-handling supporting link object having link items pointing to other object IDs among the plurality of unique object IDs; if so, checking as to whether condition data associated with the link items of the automatic-handling supporting link object is fulfilled; and automatically appointing an object ID referred to by a link item of the automatic-handling supporting link object having condition data associated therewith which is fulfilled, as a newly-selected object ID or rendering a presentation to be presented to the user, representing the automatic-handling supporting link object in a way depending on the check and appointing an object ID referred to by a link item of the automatic-handling supporting link object selected by the user via the user-operable selector, as the newly-selected object ID, wherein the processor is configured to, in analyzing the information object having the selected object ID, if the information object analyzed is an automatically-handling supporting link object, check a condition type indication within the automatically-handling supporting link object as to whether a condition type indicated thereby is supported by the broadcast receiver and, if not, ignore the condition data associated with the link items of the automatically-handling supporting link object and check a default signaling of the link items of the automatically-handling supporting link object in order to determine as to whether a link item among the link items of the automatically-handling supporting link object is determined by default.

According to another embodiment, a text-based information signal may carry text-based information content being divided onto information objects, wherein the text-based information signal is a data carousel text-based information broadcast signal in which the information objects are broadcasted in a data carousel manner, with each information object having an object ID among a plurality of unique object IDs, the information objects having link objects (M) with link items referring to other object IDs among the plurality of unique object IDs, wherein at least one of the link objects has an automatically-handling supporting indicator identifying the at least one link object as an automatically-handling supporting link object with at least one of the link items thereof having associated therewith condition data and/or a default signaling for enabling an automatically-handling of the automatically-handling supporting link object at the receiver side, depending as to whether the condition data is fulfilled or not, or as to whether the default signaling determines one or more of the link items by default, respectively.

According to another embodiment, a transmitting system may be configured to transmit a text-based information signal carrying text-based information content being divided onto information objects, wherein the text-based information signal is a data carousel text-based information broadcast signal in which the information objects are broadcasted in a data carousel manner, with each information object having an object ID among a plurality of unique object IDs, the information objects having link objects (M) with link items referring to other object IDs among the plurality of unique object IDs, wherein at least one of the link objects has an automatically-handling supporting indicator identifying the at least one link object as an automatically-handling supporting link object with at least one of the link items thereof having associated therewith condition data and/or a default signaling for enabling an automatically-handling of the automatically-handling supporting link object at the receiver side, depending as to whether the condition data is fulfilled or not, or as to whether the default signaling determines one or more of the link items by default, respectively.

According to another embodiment, a method for processing a text-based information signal carrying text-based information content being divided onto information objects wherein the text-based information signal is a data carousel text-based information broadcast signal in which the information objects are broadcasted in a data carousel manner, may have the steps of determining as to whether a predetermined information object having a selected object ID among a plurality of unique object IDs is an automatic-handling supporting link object having link items pointing to other object IDs among the plurality of unique object IDs; if so, checking as to whether condition data associated with the link items of the automatic-handling supporting link object is fulfilled; and automatically appointing an object ID referred to by a link item of the automatic-handling supporting link object having condition data associated therewith which is fulfilled, as a newly-selected object ID or rendering a presentation to be presented to the user, representing the automatic-handling supporting link object in a way depending on the check and appointing an object ID referred to by a link item of the automatic-handling supporting link object selected by the user via the user-operable selector, as the newly-selected object ID.

According to another embodiment, a method for processing a text-based information signal carrying text-based information content being divided onto information objects may have the steps of determining as to whether a predetermined information object having a selected object ID among a plurality of unique object IDs is an automatic-handling supporting link object having link items pointing to other object IDs among the plurality of unique object IDs; if so, checking as to whether condition data associated with the link items of the automatic-handling supporting link object is fulfilled; and determine whether none of the link items of the automatically-handling supporting link object has associated therewith a condition data being fulfilled; and if so, check default signaling of the link items of the automatically-handling supporting link object to determine a link object among the link objects of the automatically-handling supporting link object determined by default and automatically appointing an object ID referred to by the link item determined by default as the newly-selected object ID or rendering the presentation to be presented to the user so that the link item determined by default is easier to recognize for the user than link items of the automatically-handling supporting link object not being determined by default if at least one of the link items of the automatically-handling supporting link object has associated therewith a condition data being fulfilled, automatically appointing an object ID referred to by a link item of the automatic-handling supporting link object having condition data associated therewith which is fulfilled, as a newly-selected object ID or rendering a presentation to be presented to the user, representing the automatic-handling supporting link object in a way depending on the check and appointing an object ID referred to by a link item of the automatic-handling supporting link object selected by the user via the user-operable selector, as the newly-selected object ID.

According to another embodiment, a method for processing a text-based information signal carrying text-based information content being divided onto information objects may have the steps of determining as to whether a predetermined information object having a selected object ID among a plurality of unique object IDs is an automatic-handling supporting link object having link items pointing to other object IDs among the plurality of unique object IDs; if so, checking as to whether condition data associated with the link items of the automatic-handling supporting link object is fulfilled; and determine whether none of the link items of the automatically-handling supporting link object has associated therewith a condition data being fulfilled; and if so, check default signaling of the link items of the automatically-handling supporting link object to determine a link object among the link objects of the automatically-handling supporting link object determined by default and automatically appointing an object ID referred to by the link item determined by default as the newly-selected object ID or rendering the presentation to be presented to the user so that the link item determined by default is easier to recognize for the user than link items of the automatically-handling supporting link object not being determined by default if at least one of the link items of the automatically-handling supporting link object has associated therewith a condition data being fulfilled, automatically appointing an object ID referred to by a link item of the automatic-handling supporting link object having condition data associated therewith which is fulfilled, as a newly-selected object ID or rendering a presentation to be presented to the user, representing the automatic-handling supporting link object in a way depending on the check and appointing an object ID referred to by a link item of the automatic-handling supporting link object selected by the user via the user-operable selector, as the newly-selected object ID.

According to another embodiment, a method for processing a text-based information signal carrying text-based information content being divided onto information objects may have the steps of determining as to whether a predetermined information object having a selected object ID among a plurality of unique object IDs is an automatic-handling supporting link object having link items pointing to other object IDs among the plurality of unique object IDs; if the information object analyzed is an automatically-handling supporting link object, checking a condition type indication within the automatically-handling supporting link object as to whether a condition type indicated thereby is supported by the broadcast receiver and, if so, checking as to whether condition data associated with the link items of the automatic-handling supporting link object is fulfilled; and automatically appointing an object ID referred to by a link item of the automatic-handling supporting link object having condition data associated therewith which is fulfilled, as a newly-selected object ID or rendering a presentation to be presented to the user, representing the automatic-handling supporting link object in a way depending on the check and appointing an object ID referred to by a link item of the automatic-handling supporting link object selected by the user via the user-operable selector, as the newly-selected object ID; if not, ignoring the condition data associated with the link items of the automatically-handling supporting link object and checking a default signaling of the link items of the automatically-handling supporting link object in order to determine as to whether a link item among the link items of the automatically-handling supporting link object is determined by default.

According to another embodiment, a method for processing a text-based information signal carrying text-based information content being divided onto information objects may have the steps of determining as to whether a predetermined information object having a selected object ID among a plurality of unique object IDs is an automatic-handling supporting link object having link items pointing to other object IDs among the plurality of unique object IDs; if the information object analyzed is an automatically-handling supporting link object, checking a condition type indication within the automatically-handling supporting link object as to whether a condition type indicated thereby is supported by the broadcast receiver and, if so, checking as to whether condition data associated with the link items of the automatic-handling supporting link object is fulfilled; and automatically appointing an object ID referred to by a link item of the automatic-handling supporting link object having condition data associated therewith which is fulfilled, as a newly-selected object ID or rendering a presentation to be presented to the user, representing the automatic-handling supporting link object in a way depending on the check and appointing an object ID referred to by a link item of the automatic-handling supporting link object selected by the user via the user-operable selector, as the newly-selected object ID; if not, ignoring the condition data associated with the link items of the automatically-handling supporting link object and checking a default signaling of the link items of the automatically-handling supporting link object in order to determine as to whether a link item among the link items of the automatically-handling supporting link object is determined by default.

According to another embodiment, a receiver for a text-based information signal carrying text-based information content being divided onto information objects may have a user-operable selector; and a processor configured to analyze an information object having a selected object ID among a plurality of unique object IDs, by determining as to whether the information object analyzed is an automatic-handling supporting link object having link items pointing to other object IDs among the plurality of unique object IDs; if so, checking as to whether condition data associated with the link items of the automatic-handling supporting link object is fulfilled; and automatically appointing an object ID referred to by a link item of the automatic-handling supporting link object having condition data associated therewith which is fulfilled, as a newly-selected object ID.

According to another embodiment, a method for processing a text-based information signal carrying text-based information content being divided onto information objects may have the steps of determining as to whether a predetermined information object having a selected object ID among a plurality of unique object IDs is an automatic-handling supporting link object having link items pointing to other object IDs among the plurality of unique object IDs; if so, checking as to whether condition data associated with the link items of the automatic-handling supporting link object is fulfilled; and automatically appointing an object ID referred to by a link item of the automatic-handling supporting link object having condition data associated therewith which is fulfilled, as a newly-selected object ID.

According to another embodiment, a computer program may have instructions for performing, when running on a computer, one of the above mentioned methods.

The present invention is based on the finding that the navigation overhead and/or the content managing/updating overhead may be reduced by providing link objects such as menu objects or other menu-like objects having links to other objects, with condition data being associated with the link items of the link objects so that, depending on a check as to whether the condition data is fulfilled or not, an automatic handling of a link object may be performed. For example, the automatic handling may comprise an automatic appointment of an object ID referred to by a link item of the link object that has condition data associated therewith which is fulfilled, as a newly-selected object ID. In this case, the displaying of the link object to the user may even be suppressed. Therefore, the user is not concerned with selecting among link items of link objects, the selection among which would have been clear beforehand. Alternatively, the automatic handling may comprise rendering a presentation to be presented—such as, for example, visually and/or auditory—to the user, representing the link items of the link object in a way depending on the aforementioned check of the condition data with appointing, then, an object ID referred to by a link item of the link object that is—for example, manually—selected by the user via a user-operable selector, as the newly-selected object ID. According to the dependency on the check result, the link items having condition data associated therewith which is fulfilled, could, for example, be arranged at the beginning of the menu so as to ease the selection of these menu items by the user via the user-operable selector relative to the other ones. The opposite could be true as well. According to another embodiment or for other link objects, the dependency on the check result could be implemented such that the link items having condition data associated therewith which is fulfilled, could, for example, be highlighted with respected to the other link items to be more recognizable by the user, with leaving the order among the link items unchanged. Again, the opposite could be true as well so that these link items would be represented less recognizable. According to even another embodiment or for even other link objects, the dependency on the check result could be implemented such that the link items having condition data associated therewith which is not fulfilled, could, for example, be left away. The menu would, thus, be shortened. Even in this case, the opposite could be true as well so that these link items having condition data associated therewith which is fulfilled, would be deleted from the menu.

The condition data associated with the link items of a link object, could belong to various selection criteria. For example, the condition data could necessitate a comparison with one or more of a language setting of the broadcast receiver, a current date, current time, a current week day, a current position of the receiver, an audio or video channel which the receiver is currently attuned to, the receiver's display capability, the receiver's ability to determine the current position of the receiver, the receiver's ability to perform a navigation, the receiver's ability to access external data networks and the receiver's telecommunication capability. An condition type indication within the automatically-handling supporting link object could be used to identify which of these possible selection criteria the condition data within the link object the condition data refers to.

According to an embodiment of the present invention, the mechanism for automatic-link handling of link objects is applied to Journaline® receivers in way so that Journaline® receivers, which do not support the automatic-link handling feature, will display a standard Journaline® link object to the user for link selection when receiving a automatic handling supporting object. In order to enable older Journaline® receivers to still handle menu objects supporting automatic handling, the new automatic-handling supporting menu objects still use existing object type IDs in the object header section. The automatic-handling pertaining information is also not introduced into the link objects by use of new JML codes. Rather, the automatic-handling mechanism is built into existing object syntax via escape sequences comprising an escape symbol followed by a length indication specifying the length of the following data section, which is to be disregarded by receivers not being capable of understanding the automatic-handling mechanism.

BRIEF DESCRIPTION OF THE DRAWINGS

Embodiments of the present invention are described in the following in more detail with regard to the Figs. In particular.

DETAILED DESCRIPTION OF THE INVENTION

It is noted that the embodiments outlined below exemplarily relate to data carousel text-based information broadcasting. However, the present invention is neither restricted to carousel based data transmission nor broadcasting. Rather, differing from the below outlined embodiments, the present invention may also be applied to data transmissions where the data objects are transferred on demand. Similarly, differing from the below outlined embodiments, the present invention may also be applied to address-based data transmissions directed to specified addressees which may or may not ordered the transmission by demand, and the below-outlined embodiments may, thus, also be transferred to these applications. The following embodiments, however, will be outlined with respect to a specific possibility, namely, carousel-based broadcasting in order to ease the understanding of the principles of the present invention.

Figure 1:
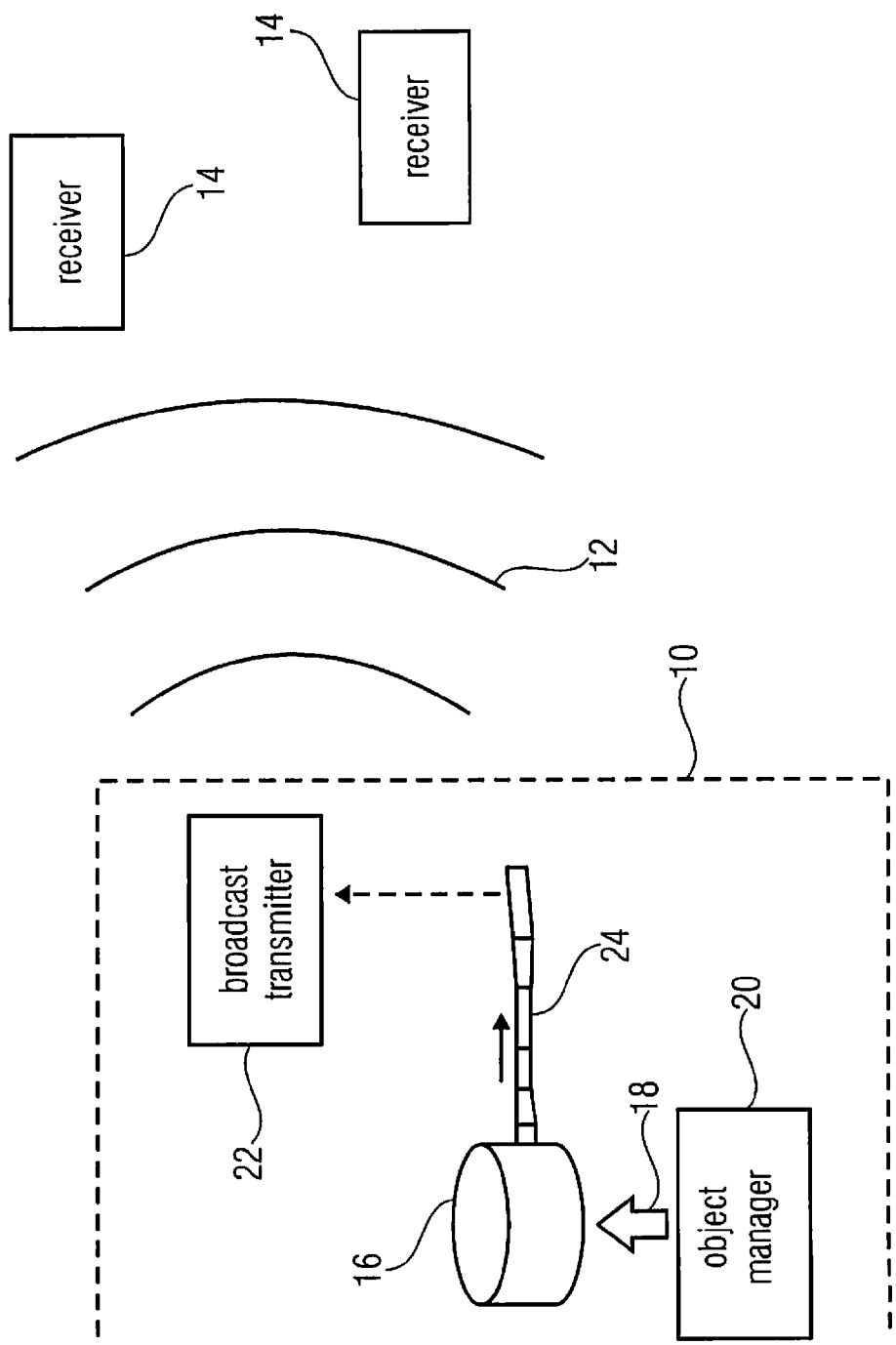
FIG. 1 shows a block diagram of a broadcast system according to an embodiment of the present invention.

FIG. 1 shows a data carousel text-based information broadcast system according to an embodiment. The system comprises a broadcast transmission system 10 for broadcasting the data carousel text-based information broadcast signal 12 to corresponding receivers 14 for receiving the signal 12. The broadcast transmission system 10 comprises an object memory 16 in which, for a plurality of unique object IDs, a respective information object is stored. The update and/or management 18 of the information objects within memory 16 including, inter alia, the association of the unique object IDs to different textual information or different textual-information pertaining subjects, is performed by an object manager 20 comprised by the broadcast transmission system 10. The object manager 20 is, for example, a computer assisting a news editor in mapping the textual information the editor wishes to broadcast onto the unique object IDs.

Further, the broadcast transmission system 10 comprises a broadcast transmitter 22. The broadcast transmitter 22 is configured to broadcast the objects 24 stored in memory 16 in the form of a data carousel. That is, the broadcast transmitter 22 transmits text information objects 24 of each object ID repeatedly at a repetition rate associated with the respective object ID.

The receivers 14 receive the data carousel text-based information broadcast signal 12 and enable a user thereof to navigate through the textual information content of said signal by selecting menu items of menu objects among the information objects 24.

For example, the receivers 14 may be radios dedicated for receiving a digital audio broadcast signal into which the data carousel text-based information broadcast signal 12 is embedded. Alternatively, the receivers may be a televisor or some other multi-media device and the signal 12 may generally a part of a multi-media, audio, video and/or data broadcast signal. For illustrative purposes only, in the following description merely the audio alternative is described. However, whenever the audio option is mentioned, the other possibilities are possible alternatives although not specifically mentioned.

As it will be outlined in more detail below, the receivers 14 may comprise a presentation device such as a graphic or text display, a printer or, additionally or alternatively, a loud speaker for presenting to the user, a presentation representing the textual content of the objects 24 or at least an output for outputting the presentation to a respective presentation device. Accordingly, the broadcast transmission system 10 may be part of a digital audio/video/data broadcast system. However, the present invention is not restricted to this example of wireless transmission. Rather, any non-directional transmission of signal 12 to receivers 14 could be used.

As already outlined above and as will be described in more detail below with respect to FIG. 4, the textual information contained in signal 12 is divided-up into objects 24 which, in turn, may be organized in a hierarchic tree structure by means of link objects among objects 24. In particular, each object 24 may be of a specific object type. Among the object types, link objects and non-link objects may be distinguished. Link objects comprise link items pointing to other objects and being selectable by users by interacting with the receiver. Link objects may, for example, menu objects or text objects having hot buttons pointing to other objects. For sake of simplicity, in the following description, the link objects are assumed to be menu objects. However, the following embodiments are readably transferable to other object types although not explicitly mentioned.

Menu objects may, for example, result in a menu presented to the user, the menu comprising menu items among which the user may choose, and which refer or point to other objects with another object ID.

Non-link objects which will be referred to as message objects in the following, do not comprise any reference or pointer to any other object ID, but may merely be pointed to by one or more of the menu (or link) objects by use of its unique object ID.

Figure 2:
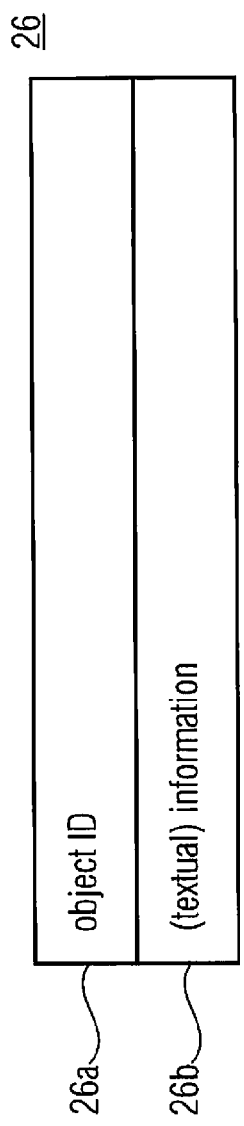
FIG. 2 shows a schematic diagram illustrating a method object according to an embodiment of the present invention.

FIG. 2 shows an example for a message object 26. As can be seen, the message object comprises its unique object ID 26a and information 26b. The information 26b may comprise pure text or may be supplemented by some additional data such as specific symbols, graphic or even some multimedia elements, like images or video sequences. As indicated by the parenthesis, it may even be possible that a message object 26 merely comprises non-textual information in section 26b. Escape symbols may be used in order to guarantee for back-compatibility with receivers 14 not being capable of handling the additional non-textual information portion of section 26b and instead to merely present the textual portion thereof to the user.

Figure 3:
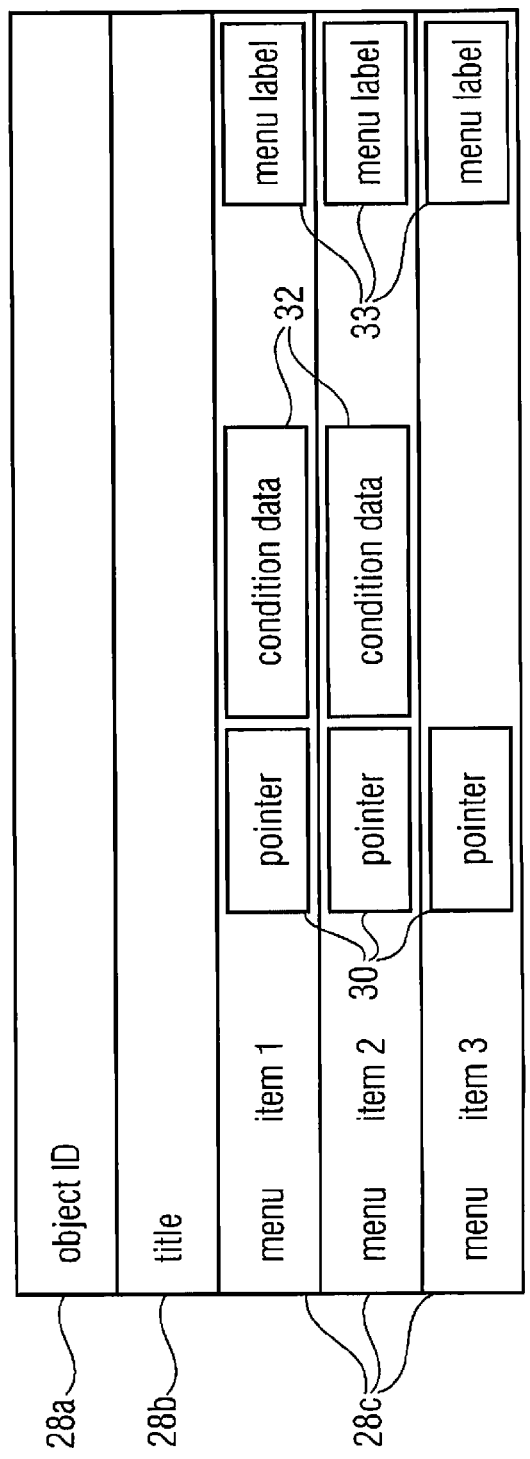
FIG. 3 shows a schematic diagram of an automatic-handling supporting menu object according to an embodiment.

FIG. 3 shows a menu object 28 as comprising an object ID 28a, a title section 28b and one or several menu items 28c. As shown in FIG. 3, each menu item 28c has associated therewith a pointer 30 referring to another object ID. Further, at least one of the menu items 28c has associated therewith condition data 32 defining a condition, which may be checked at the receiver's side, to be fulfilled or not fulfilled. As will be outlined below, the condition data associated with one menu item 28c may even composed of more than one condition with the condition data 32 being fulfilled if all or, alternatively, at least one of the conditions is fulfilled. Then, on the basis of the respective check result, an automatic handling of the menu object 28 is performed as will be described in more detail below.

The title section 28b comprises textual information describing the title. Similarly, each menu item section 28c comprises a menu label 33, i.e. textual information, describing the respective menu item.

Further, although not explicitly mentioned above, message objects 26 and menu objects 28 may comprise an object-type identifier enabling distinguishing therebetween to enable identifying a menu object as menu objects and a message object as message objects. Further, besides the object types illustrated in FIGS. 2 and 3, other object types may be available as well.

The way FIGS. 2 and 3 exemplify message and menu objects is of illustrative nature only. The data sections shown therein may be sequentially arranged within the object in the order from top to bottom as shown in these Figs., or may be arranged in any other way within the respective object. Moreover, some data sections may be optional such as, for example, the title section 28b or may even be not provided. Further, the data sections 28a to 28c and 26a and 26b may be of a fixed predetermined size or may be of varying size with respective sectioning symbols indicating the boarders between the sections such as, for example, at the beginning of each subsequent section, respectively. Similarly, the pointer 30, the condition data 32 and/or the menu label 33 do not necessarily have to be included within a respective common even contiguous menu item section 28c to which they belong or which they form. Rather, it is sufficient if the association between pointers 30, condition data 32 and menu label 33 together forming a menu item 28c is derivable at the receiver's side. Further, the difference between menu/link objects and non-link/message objects may vanish and the object type indication may thus be obsolete with, then, the difference between these objects merely being the absence or existence of link items wherein the link items may, as outlined above, menu items forming an ordered list of menu options or hot buttons placed anywhere in the presentation of the respective object. Thus, FIG. 3 may also be interpreted as showing an example for a more generic link object by replacing "menu" by "link" and replacing "title" with "text-based information". Again, in the following, reference is made to menu objects for illustrative purposes only, and this following description may easily be transferred to any type of link object in the same way, i.e. be replacing the term "menu" by "link". Finally, it is noted that in the following description the term "menu item" is sometimes also used to denote the respective "menu label" describing the same.

As already noted above, the information content contained in objects 24 is hierarchically organized by means of the menu objects 28. To illustrate this, reference is made to FIG. 4. FIG. 4 shows menu objects and message objects arranged in an illustrated tree structure as defined by the pointers of the menu items of the menu objects. In particular, menu objects are illustrated by rectangles 44 having rounded corners and being marked with "M" and message objects are illustrated by rectangles having right-angled corners and being marked with "T". As already denoted above, each object 24 is assigned a unique object ID. In other words, the objects 24 shown in FIG. 4 each have a unique object ID associated therewith, which is different from the object ID of any other object 24 shown in FIG. 4, with each of these objects 24 being repeatedly transmitted via signal 12 (FIG. 1). Again, the repeated transmission may be left away in other non data-carousel applications and the transmission may even be performed on demand such as via the internet. However, in the following, the specific embodiments are, for illustrative purposes only, described with respect to a data-carousel transmission.

Figure 4:
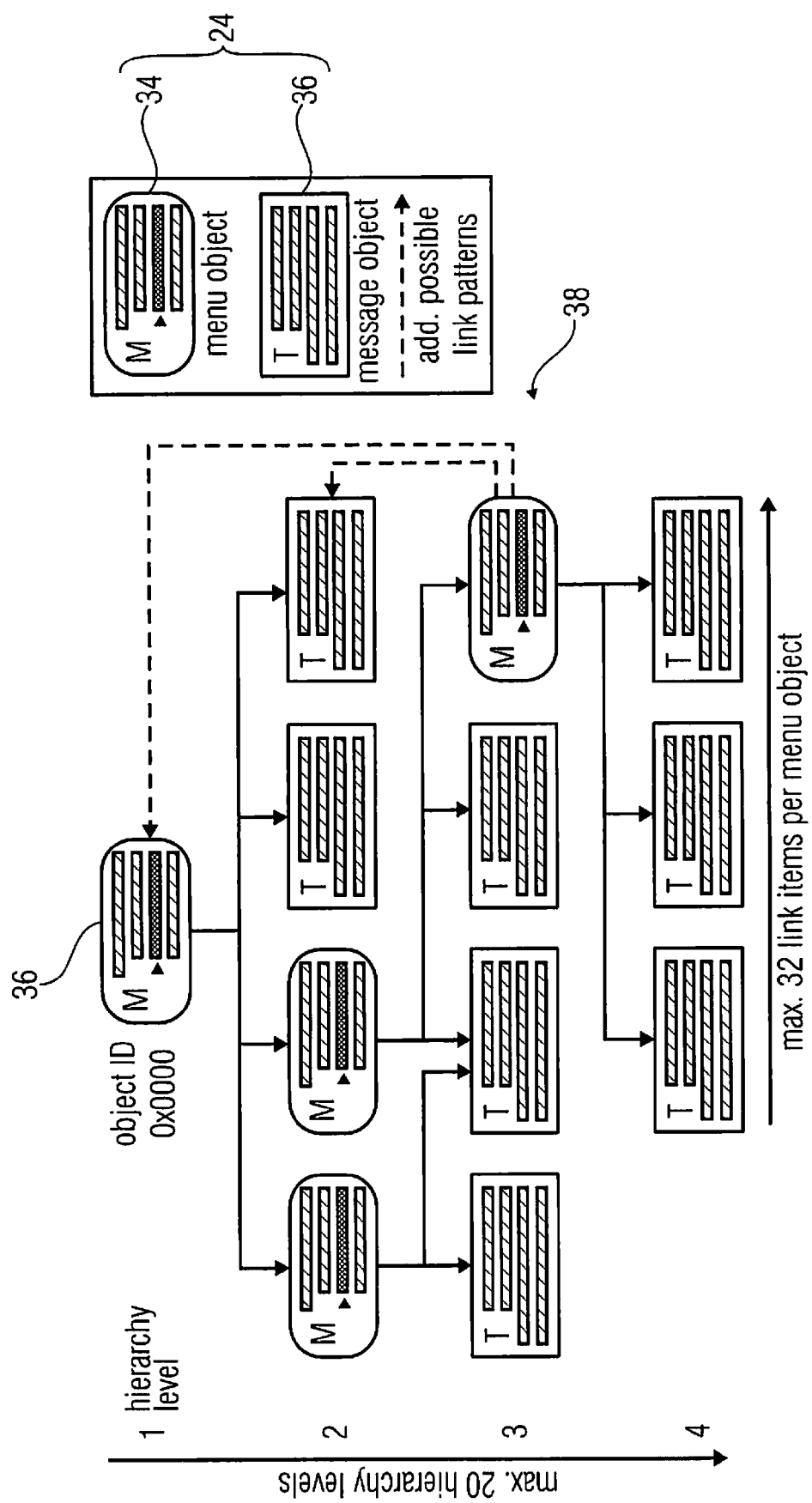
FIG. 4 shows a schematic diagram of a hieratical tree structure of objects according to an embodiment.

As shown in FIG. 4, one of the menu objects 34 is associated with a specific object ID, which is, in the case of FIG. 4, exemplarily the object ID 0x0000. This object 36 forms a root of the tree structure 38 into which the objects 24 are structured by the pointers 30. The specific object ID of the root object 36 may be known to the receivers 14 and may be initially presented to the user by the receivers upon turning on the receiver. The root object 36 forms a first hierarchy level of the hierarchical tree structure 38. The pointers 30 of the menu items of the root object 36 point to objects 24 having different object IDs and forming the second hierarchy level as illustrated by arrows starting from root object 36 and extending to the objects 24 of the second hierarchy level. The menu objects of the second hierarchy level, in turn, have menu items with pointers pointing to objects having a respective different object ID.

The "hierarchy level" of an object 24 may be defined as the shortest possible path from the root object 36 to the respective object. Although the range of hierarchy levels may be unrestricted, according to an embodiment, the number of hierarchy levels may be restricted to some maximum value, such as 20 hierarchy levels. Similarly, the number of menu or link items per menu object 34 may be unlimited or may be restricted to some maximum value. In the case of FIG. 4, the number of hierarchy levels is exemplarily shown to be restricted to 20 and the number of link or menu items per menu object 34 is exemplarily shown to be restricted to a maximum of 32.

As is shown in FIG. 4, an object 24 may be referred to or pointed to by respective menu items of more than one menu object. Further, the pointer of the menu item of a certain menu object 34 is not restricted to point to an object of the subsequent hierarchy level. Rather, the menu object of a certain hierarchy level may have a menu item pointing to an object having a different object ID within a lower hierarchy level as it is illustrated by dotted lines in FIG. 4.

Figure 5:
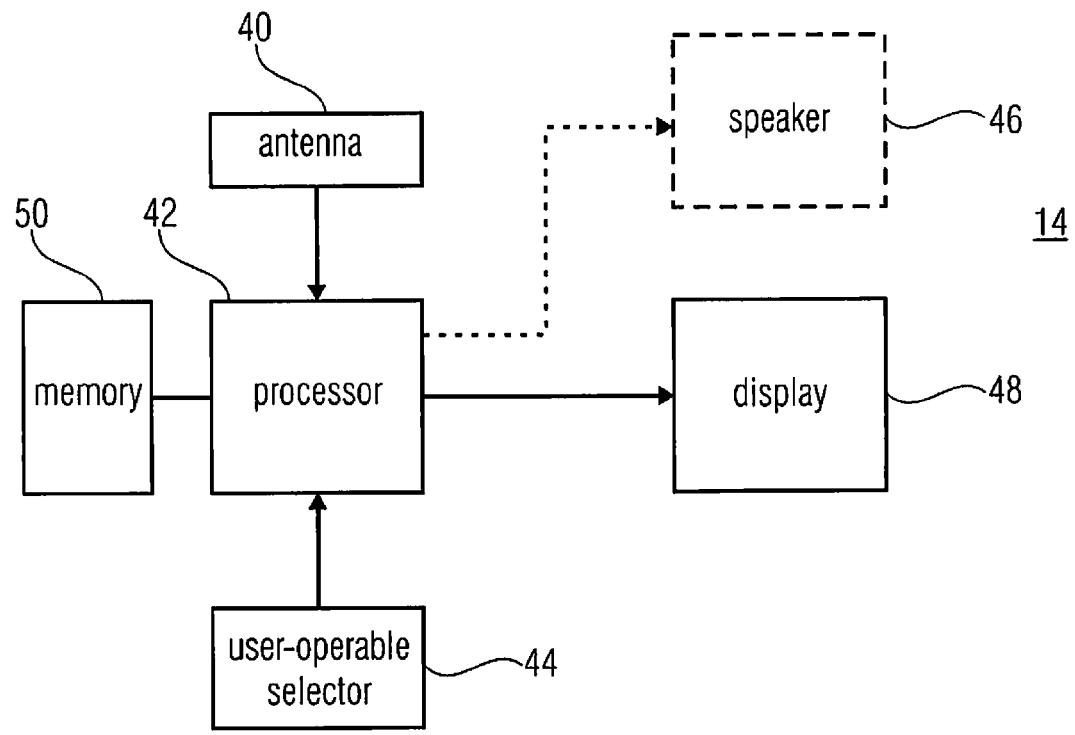
FIG. 5 shows a block diagram of a receiver according to an embodiment.

FIG. 5 shows an example of a receiver 14 in accordance with an embodiment. The receiver 14 comprises an antenna 40 for receiving the data carousel text-based information broadcast signal 12 (FIG. 1), a processor 42, a user-operable selector 44, a speaker 46, a display 48 and a memory 50.

The antenna 40 is for receiving signal 12 and may be replaced by a contact-based receiver input in case of a wired transmission of signal 12. In particular, the receiver 14 illustrated in FIG. 5 may be an audio receiver or radio with a processor 42 being configured to extract an audio channel from an audio broadcast signal received via antenna 40 and output same to speaker 46 in order to be presented to the user, wherein the processor 42 may be responsive to the user operating the user-operable selector 44 or some other input to change the channel to be extracted from the audio broadcast signal and output to speaker 46. However, receiver 14 may, alternatively, be a receiver especially dedicated for extracting the textual information from signal 12, in which case the loudspeaker 46 may not be comprised by receiver 14. Further, the antenna may be external to the receiver. For example, the antenna may be an antenna integrated into the windscreen, rear screen or side windows of a car into which the receiver may be built in.

As will be described in more detail below, the processor 42 is configured to assist the user in navigating through the tree 38 (see FIG. 4) of objects. In particular, processor 42 is configured to monitor the broadcast signal 12 or cached parts thereof, to detect an object 24 having a selected object ID associated therewith and to render a presentation screen representing the content of this information object, provided same is actually to be displayed to the user as will be described below. The processor 42 outputs the presentation screen to display 48. If the object currently displayed is a menu object, the user is prompted to select one of the menu items of the menu object. In particular, the user is able to select one of the menu items by use of the user-operable selector 44.

The selector 44 may be a toggle switch such as, for example, a four-toggle switch, or a rotating knob or may comprise a touch screen capability, or a combination thereof. Even a speech recognition input capability enabling speech control would be feasible. Depending on the input alternatives supported, the processor may be configured to highlight an actually selectable menu item which is selected upon the user affirming its selection by, for example, pressing some switch or the like.

The processor 42 is configured to, upon a selection of a certain menu item by the user, appoint the object ID referred to by this menu item as a newly-selected object ID, whereupon processor 42 monitors the broadcast signal 12 or a cached part thereof stored in a cache, again in order to detect an object 24 having this object ID associated therewith, and so on. Processor 42 may use the memory 50 in order to keep track of the recently visited object IDs in their visiting order. In other words, processor 42 may store a path history in memory 50, the path history comprising a list of traversed object IDs when navigating from the root object 36 to any other object 24. The path history stored in memory 50 may be restricted to a certain number of object IDs, with this number being, for example, equal to the maximum number of hierarchy levels or greater than the latter. Processor 42 may use the path history in order to obtain the object ID of the menu objects from where the user reached the currently-displayed object upon the user requesting returning to this previous menu by use of, for example, the user-operable selector 44 or some other input means of receiver 14 indicating the user's whish to return to the parent menu. The processor 42 may be configured to shorten the history path in case a newly selected object ID is already present in the path history list stored in memory 50. Further, the processor 42 may be configured to remove the oldest or any other object IDs from the path history list upon the number of different object IDs in the path history exceeding the maximum number.

The display may be text or graphic display such as a TFT, LCD or OLED display, for example. Similarly to the antenna, same may be external to receiver. For example, display 48 may be the display of a car into which the receiver may be built in and which is, for example, also used to display other information such as navigation or video information from other sources.

Before an embodiment of the functionality of receiver is described in more detail below, it is noted that the receiver of FIG. 5 is merely a specific embodiment and that several changes may be made with, nevertheless, achieving the same or similar advantages. For example, although the receiver of FIG. 5 was shown to comprise a display 48 as a device for presenting the textual content of the information objects to the users, other presentation devices are possible as well such as the loud speaker 46 in which case the processor would by configured to, in rendering the presentation to be presented to the user, convert textual content of the objects such as the link/menu labels, into speech, or a printer (not shown) in which case the processor would involve a printer driver in rendering the presentation to be presented to the user. Further, the receiver could be a computer. Even further, in case of the text-based information signal not being a data-carousel broadcast signal, the receiver could be configured to order or pull the object having the currently selected object ID from the transmission site instead of monitoring a data-carousel signal to intercept the object having the selected object ID. However, the following description illustratively concentrates on a data-carousel signal application.

Figure 6:
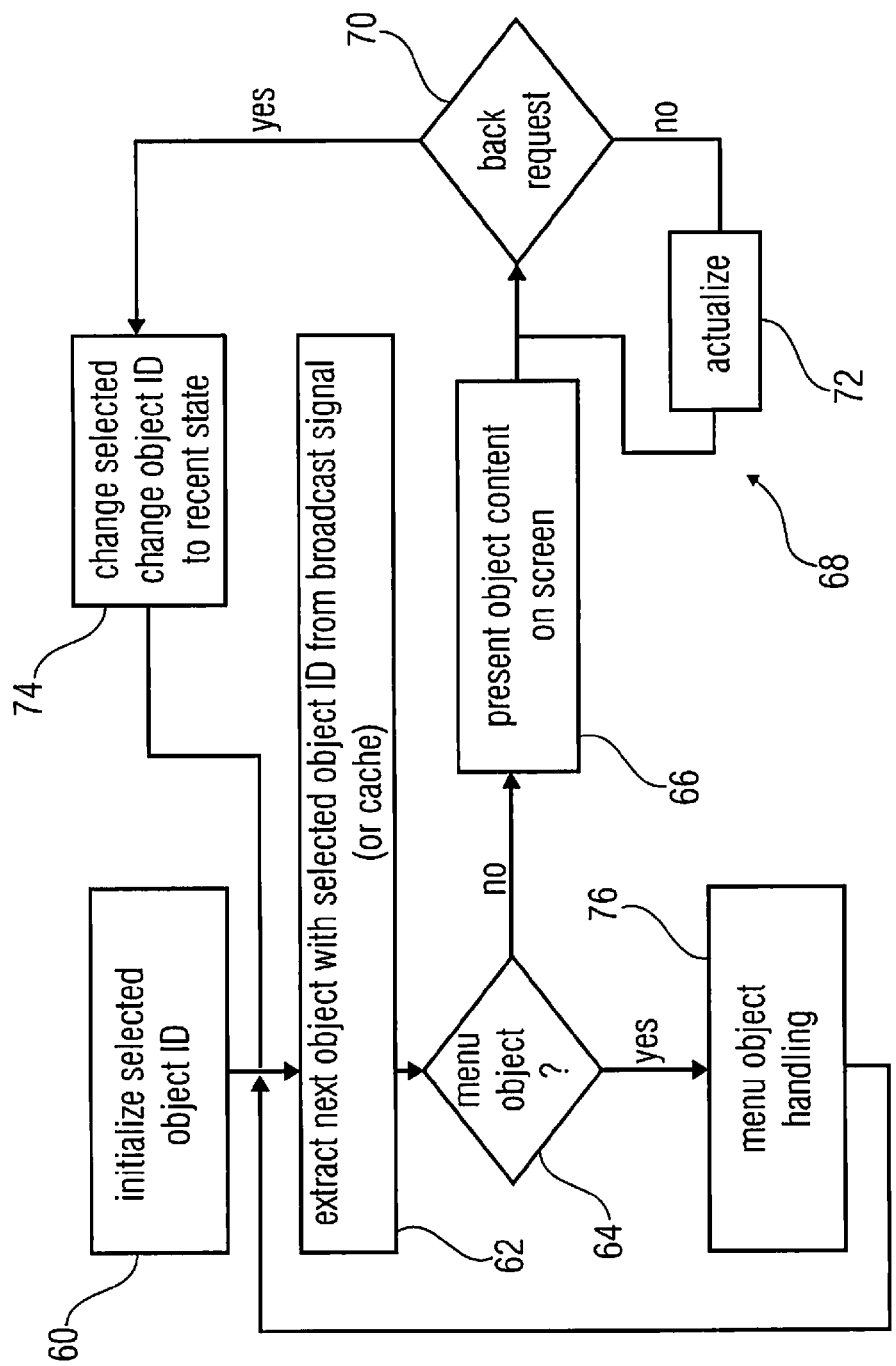
FIG. 6 shows a flow chart illustrating a mode of operation of the processor of the receiver of FIG. 5 according to an embodiment.

Referring to FIG. 6, the mode of operation of receiver 14 is described in accordance with an embodiment. When entering the information service represented by the broadcast signal 12, such as when switching on receiver 14, the selected or current object ID is initialized in step 60. For example, the selected object ID may be initialized to the object ID of the root object 36 (FIG. 4) as has already been described above. Thereupon, processor 42 extracts 62 a next object 24 within data carousel broadcast signal 12 having the selected object ID associated therewith. In addition, prior to the extraction 62, processor may try to fetch a cached version of an object having the selected object ID from an internal object cache in, for example, memory 50. If available, processor may use the cached version and may proceed with analyzing the object as described below. Again, in a non data-carousel system, step 62 may comprise processor 42 actively requesting an object having the selected ID from a server.

In analyzing this object, processor 42 determines as to whether the object obtained in step 62 is a menu object in step 64. If this is not the case, processor 42 presents the object content on the display 48 in step 66. The user may need some time to read the text contained within the current object having a current/selected object ID and during this time, processor 42 cycles though a waiting loop 68. In particular, processor 42 checks as to whether the user requests to return to the previous menu object from the aforementioned path history by monitoring, for example, the user-operable selector 44 or some other input means of the receiver 14 in step 70. During that time that this is not the case, processor 42 monitors the broadcast signal 12 to determine as to whether the broadcast signal transmits another object with the current/selected object ID and, if so, as to whether this more-recently transmitted object has been revised relative to the currently-displayed object, wherein processor 42 may perform this determination based on a revision index comprised by any message object, although not shown in FIG. 2. Optionally, processor 42 may actualize the presentation screen displayed on display 48 in step 72 if a more actual object has been found. Again, in a non data-carousel system, step 72 could comprise processor 42 actively and intermittently checking at a server as to whether a newer version object having the selected ID is available and, if yes, updating the presentation screen.

Further, as soon as the user requests returning to the previous main object, processor 42 appoints the most-recently visited object ID of the path history in memory 50 as the newly-selected object ID in step 74, whereupon the operation proceeds with step 62.

Figure 7:
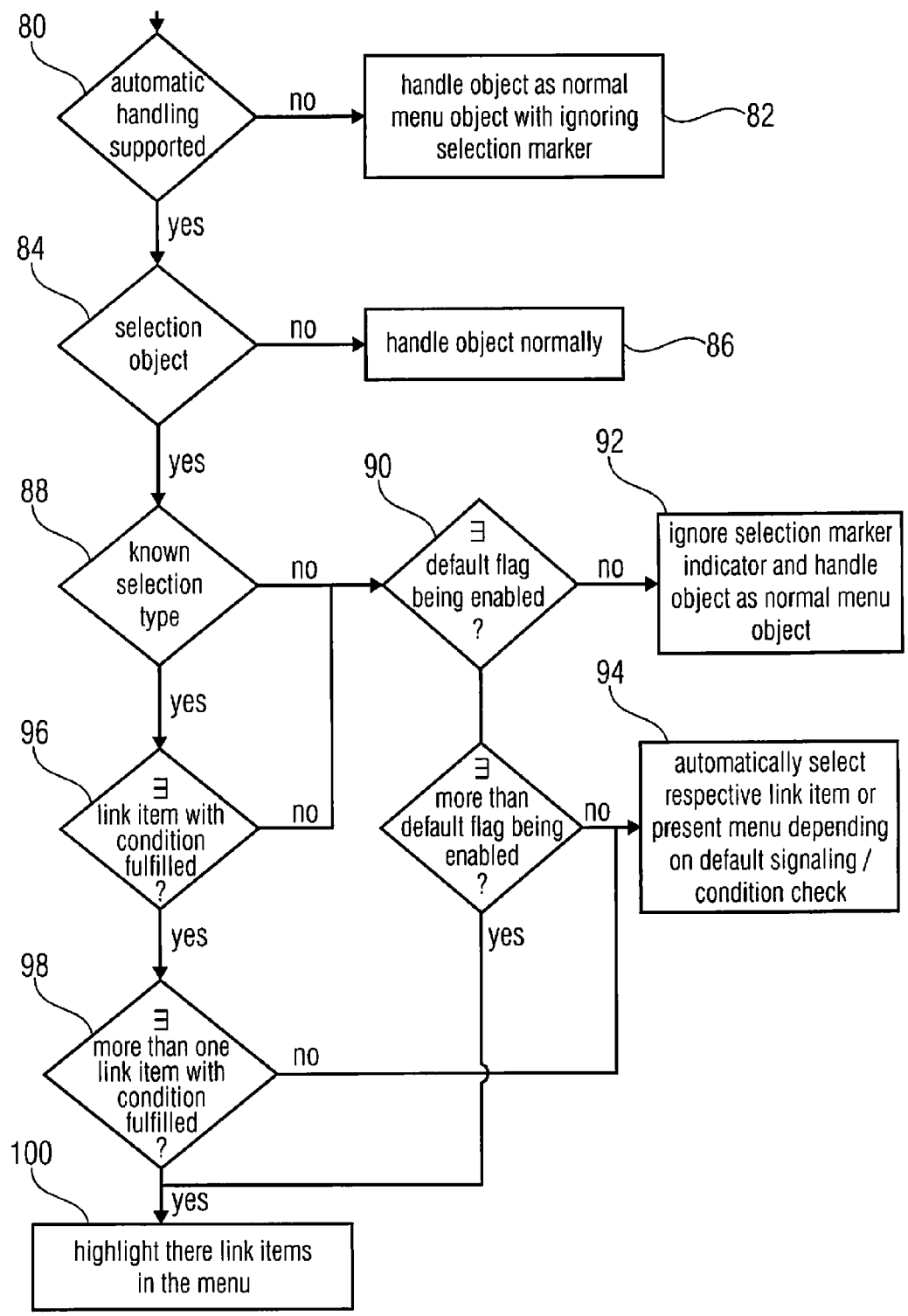
FIG. 7 shows a flow chart of a menu object handling of the receiver of FIG. 5 according to an embodiment.

If processor 42 determines in step 64 that the object having associated therewith the selected object ID is a menu object, the operation proceeds with a menu object handling 76 which is described in more detail with respect to FIG. 7.

When handling menu objects, processor 42 firstly determines in step 80 as to whether the receiver 14 itself supports automatic handling or as to whether the automatic handling feature of the receiver is activated by the user. If not, processor 42 ignores the condition data 32 (see FIG. 3) of the menu items and handles the menu object normally. Thus, if the current menu object is an object supporting automatic handling, processor 42 ignores eventual condition data and handles the menu object normally in step 82. If, according to the different object types, normal menu objects which do not comprise the condition data 32 shown in FIG. 3, co-exit with automatic-handling menu objects, processor 42 handles both types identically in step 82. That is, processor 42 cycles through a loop, which is similar to that shown in FIG. 6 in steps 70 and 72 with, however, the processor 42 being responsive to not only the user instructing to return to the previous menu, but also to the user's instruction by use of the user-operable selector 44 to change to an object having an object ID associated with one of the menu items of the current normal menu object. In other words, in step 82, processor 42 displays the menu on display 48 and if the user selects one of the menu items, processor 42 changes the current object ID to the object ID to which the pointer 30 of the selected menu item 28c (see FIG. 3) refers. Until this time or until the user requesting to return to the previous menu, processor 42 may actualize the menu if the menu object with a currently displayed object ID and having a different revision index occurs in the broadcast signal.

Again, in a non data-carousel system, processor 42 could actively and intermittently check at a server as to whether a newer version object having the selected ID is available and, if yes, updating the presentation screen. In performing the determination 80, processor 42 checks, for example, a state within memory 50, which is user-settable according to the user's preferences. If, for example, the user does not wish processor 42 to automatically handle automatic-handling supporting menu objects, steps 80 and 82 will cause these menu objects to be handled like normal menu objects. It is noted, however, that steps 80 and 82 could be left out if the receiver 14 steadily supports automatic handling of automatic-handling supporting menu objects.

However, if the automatic-handling is supported, processor 42 determines in step 84 as to whether the current menu object is an object supporting automatic handling. If not, processor 42 handles the normal menu object as described above with respect to step 82. It should be noted, however, that it is also possible that the afore-mentioned co-existence of normal menu and automatic-handling supporting menu objects does not exist but that merely the latter ones exist. In this case, steps 84 and 86 may be left out.

However, if automatic-handling is supported or active and the current object supports automatic handling, then processor 42 determines in step 88 as to whether the selection type associated with the automatic-handling supporting menu object is known to receiver 14 or not. As will be described in more detail below, it is possible that the broadcast signal 12 allows the condition data 32 within an automatic-handling supporting menu object 28 (see FIG. 3) to pertain one of a plurality of different types of conditions. That is, the broadcast signal 12 may comprise automatic-handling supporting menu objects 28 where the condition type differs from object to object. Further, the condition data within one automatic-handling selection menu object 28 could optionally be restricted to be directed to one condition type only. Examples for selection/condition types comprise language, date, time, week day, a geographic region, an audio or video channel which the receiver may be attuned to, a display capability, a hardware capability to determine the current position of the receiver, a hardware capability to perform a navigation, a hardware capability to access external data networks and/or a hardware capability to allow the user to telecommunicate.

If processor 42 or receiver 14 does not know or is not able to handle the selection type of the current menu object, processor 42 checks the menu items to determine as to whether any of these menu items is to be selected by default in case the condition data is not fulfilled or the condition/selection type is unknown, or as to whether any of the menu items has associated therewith a default flag being enabled. This check is performed in step 90. Step 90 is optional. That is, such default indication capability does not have to be provided within the broadcast signal 12. If none of the menu items is indicated to be selected by default, processor 42 handles the current automatic-handling supporting menu object in step 92 as it was the case in steps 82 and 86. That is, the condition data is ignored and the menu object is handled normally.

Then, processor 42 checks the menu items to determine as to whether more than one of these menu items is to be selected by default and as to whether any of the menu items has associated therewith a default flag being enabled, respectively. If not, i.e. if exactly one of the menu items is indicated to be selected by default, processor 42 automatically selects in step 94, the respective link/menu item and appoints the object ID pointed to by the pointer of said menu item as the newly-selected object ID with the processing then proceeding with step 62 in FIG. 6. Alternatively, the indication of the menu item by default, merely results in processor 42 highlighting said link item in the menu when displaying the menu on display 48, arranging same at the first position or shortening the menu to maintain merely the default menu item in step 94 with then awaiting the user's input as already outlined above with respect to step 82. In the latter case, the automatic handling most likely facilitates the selection to be performed manually by the user due to the fact that the default menu item is highlighted within the menu displayed. According to the automatic selection alternative, the user may not even bothered with the menu. That is, processor 42 may suppress the displaying of the menu to the user so that the navigation of the user through the object tree is likely to be facilitated.

If more than one of the menu items is to be selected by default and has associated therewith a default flag being enabled, respectively, the processor 42 presents the menu to the user with, however, highlighting said link items in the menu when presenting the menu to the user, arranging same at the first positions o the menu or shortening the menu to maintain merely the default menu items in step 100.

If the selection type is known, processor 42 determines in step 96 as to whether any or at least one menu item exists the condition data of which is fulfilled. If the determination 96 reveals that there is no menu item with its condition data being fulfilled, the process proceeds at step 90 where the default indication is checked. However, if there is at least one menu item with its condition data being fulfilled, processor 42 then determines in step 98 as to whether there is more than one link/menu item with its condition data being fulfilled. If this is the case, the processor 42 displays the menu on display 48 with, however, highlighting the link/menu items having its condition data being fulfilled in step 100, arranging same at the first positions of the menu or shortening the menu to maintain merely the link/menu items having its condition data being fulfilled. The opposite may also be true, i.e. processor 42 may displays the menu on display 48 with, however, rendering the link/menu items having its condition data being fulfilled less visible, arranging the same at the last positions of the menu or shortening the menu by removing the link/menu items having its condition data being fulfilled. The selection among these options may be fixed or may depend on the selection type.

If, however, there is merely one link/menu item, the condition data of which is fulfilled, the process proceeds with step 94. That is, processor 42 automatically selects the matching link/menu item and appoints the object ID pointed to by the pointer of said menu item as the newly-selected object ID with the processing then proceeding with step 62 in FIG. 6. Alternatively, processor 42 highlights said link item in the menu when displaying the menu on display 48, arranges same at the first position or shortens the menu to maintain merely the default menu item in step 94 with then awaiting the user's input as already outlined above with respect to step 82. Again, the opposite may also be true, i.e. processor 42 may displays the menu on display 48 with, however, rendering the matching link/menu item having its condition data being fulfilled less visible, arranging the same at the last position of the menu or shortening the menu by removing the matching link/menu item having its condition data being fulfilled.

The actual processing performed by processor 42 and determining as to whether condition data is fulfilled or not (steps 96 and 98) depends on the kind of condition data. For example, if the condition data indicates a certain date or a certain time or some weekday, or the like, processor 42 compares the respective condition data with information on the current date, current time or current weekday with the processor 42 obtaining the latter information from, for example, an internal clock. If the condition type is the language, processor 42 compares the condition data, for example, with an internal language setting. For example, this language setting may be fixed from the manufacturer of receiver 14. Alternatively, the language selection may be user-settable so that the user may change the advantageous language of the textual information he or she is presented with. In case of the condition type indicating the hardware capability of receiver 14, processor 42 may, for example, compare the condition data with a version number of receiver 14 reflecting, for example, how old the receiver is and to what extent the receiver is able to process certain parts of the objects reachable via the respective link item. In other words, processor may compare the condition data with one or more of a language setting of the broadcast receiver, a current date, current time, a current week day, a current position of the receiver, an audio or video channel which the receiver is currently attuned to, the receiver's display capability, the receiver's ability to determine the current position of the receiver, the receiver's ability to perform a navigation, the receiver's ability to access external data networks and the receiver's telecommunication capability.

It should be noted that the presentation of the menu items the condition data if which is fulfilled, may even depend on the condition type itself. For example, while the menu items the condition data if which is fulfilled may be rendered more recognizable for the user when the condition pertains the language, the menu items the condition data if which is fulfilled may even be hidden or rendered less recognizable for the user when the condition pertains a receivers minimum hardware capability in order to prevent the user from, or render more difficult the user selecting menu items pointing to objects the content of which is not useful for the receiver in an sufficient way.

In any case, the automatic-handling performed in steps 94 and 100 eases the user's navigation through the information service contained within broadcast signal 12. For example, the highlighting of links having its condition data being fulfilled or being indicated to be selected by default, renders the selection of the respective menu items easier for the user. By this way, it is possible to ease the selection of menu items for the user, which are more likely to be advantageous for the user than the other menu items. For example, the user may set its language according to his preference so that respective menu items pertaining this language will be highlighted within the menu relative to the other menu items. The object manager (see FIG. 1), in turn, may provide menu items which, according to their semantic content, are merely interesting during certain dates or daytimes with condition data indicating these dates or daytimes so that during these times, the user's attention is drawn to these menu items.

As indicated above, the highlighting may ease the user's selection of the respective menu items relative to the other menu items. It is even possible to suppress the displaying of menu items having condition data not being fulfilled. Further, highlighting the menu items having its condition data being fulfilled or being indicated to be selected by default may be highlighted by indicating the other menu items in a less-visible sense.

The automatic selection in step 94, in turn, especially eases the navigation of the user through the object tree. The user does not have to select any of the menu items. Moreover, the selection, which is automatically performed, most likely complies with the preferences of the user due to the above-mentioned setting of the condition data by the broadcast signal's editor or by the user's setting respective settings of its receiver.

After having described embodiments of the present invention with no particular preference to any specific news service, the following description describes an embodiment of automatic-object handling in case of the existing NewsService Journaline®. In other words, the following description describes supplementing the NewsService Journaline® with menu objects supporting automatic handling as described above with the supplementing feature being realized such that older receives, which were not built to handle automatic-handling supporting menu objects, are still able to handle these new objects like normal menu objects (compare step 86). It is noted, however, that the below outlined embodiment is also transferable to other link objects of the NewsService Journaline®, such as objects having hot buttons or interactivity features pointing to other object IDs, or future other object types may be extended to support automatic handling as outlined below.

A mechanism for automatic-link selection from a menu by Journaline® receivers based on language or other preferences is described in the following. Journaline® receivers, which do not support the automatic-link selection feature, will display a standard Journaline® menu object to the user for menu selection instead. If a receiver cannot make a choice by itself, because, for example, there is no language set, then the broadcaster can decide whether he wants a default selection or if the user should manually select a link.

In order to enable older Journaline® receivers to still handle menu objects supporting automatic handling, the new automatic-handling supporting menu objects still use the same object type ID in the object header section than normal menu objects, i.e. object-type ID 001. The automatic-handling pertaining information is also not introduced into the menu objects by use of any of the JML codes or syntax elements used for dividing-up the JML object's content sections serially into logical blocks of information, such as title, menu item, and so on (compare FIG. 2). New JML codes would not be interpretable by older receivers. Rather, the automatic-handling mechanism is signaled via the data sections of escape sequences defined in the Standard (ETSI TS 102979 V1.1.1). The escape symbol used in Journaline® is 0x1A followed by one byte specifying the length of the following data section. The whole data section is to be disregarded by receivers not being capable of understanding the automatic-handling mechanism. Obviously, maximally 256 bytes may be contained within the escape sequence data section. To extend this size, a special escape symbol, namely 0x1B may be used to provide a further data section for accommodating a immediately following part of the automatic handling data such as condition data. The latter symbol is also followed by a byte indicating the length of the data extending section. All data sections of a run of escape sequences—comprising merely one or more escape symbols 0x1B—are then concatenated in order to yield an automatic handling unit such as a condition data or selection marker, or a selection type indication.

The content of each data section starts with a data section (DS) type indication of 8 bits. In order to signal the automatic-handling mechanism, two new Journaline® data section types are introduced, namely DS "selection object" and DS "selection marker". The automatic handling is, according to the present embodiment, applied to Journaline® menu objects although, as indicated above, other possibilities would be available as well. At most, one selection criterion or selection type per menu object may be allowed. Broadcasters may decide to base content selection on several different selection types by cascading menu objects with different selection types in their respective object data section.

The DS selection objects may be signaled by DS type code 0xC0 succeeding a respective length indication which, in turn, follows an escape symbol. The DS selection object may be restricted to occur maximally once before the first visual text character within the respective menu object. Moreover, as already indicated above, the DS type symbol 0xC0 may be restricted or may be available only for menu objects.

As described in more detail below, the DS type symbol 0xC0 signals to the receiver that the current JML menu object supports automatically handling such as automatically selecting one of its link items. Such a menu object is called selection object in the following. The condition for the automatic handling including automatic selection is provided with the selection marker DS (0xC1) described in more detail below.

The selection marker could be signaled by use of DS type symbol 0xC1. Again, this symbol would succeed a respective length indication which, in turn, follows an escape symbol. Of course, selection markers are only available for selection objects. Its position within the data sequence of the selection object could be restricted to the position between the pointer or link target of a respective menu item and the first visual text character of said menu item (compare FIG. 8). The selection marker defines the selection condition(s) for a link item within the selection object. Zero, one or more selection markers shall be defined per link item. The condition for the link item is fulfilled if the condition in at least one of its selection markers is fulfilled. Moreover, the condition of link items having no selection marker may be interpreted as being fulfilled. Alternatively, the condition of link items for which no selection marker is provided may be interpreted as generally not being fulfilled. In the following, the first alternative is assumed to be true. However, it is noted that the fiction regarding the conditions of menu items without selection markers being fulfilled or not, may even depend on the selection type/criterion contained in the DS selection object.

Both DS type symbols are followed by respective codes describing, for example, the selection/condition type and the menu item selection condition itself and a default flag, respectively. As far as the selection marker is concerned, it might be that a restriction is posed onto these markers according to which merely one selection marker per selection object may have the default flag enabled. However, as was described above, it is also possible to allow more than one default flag to be enabled.

Figure 8:
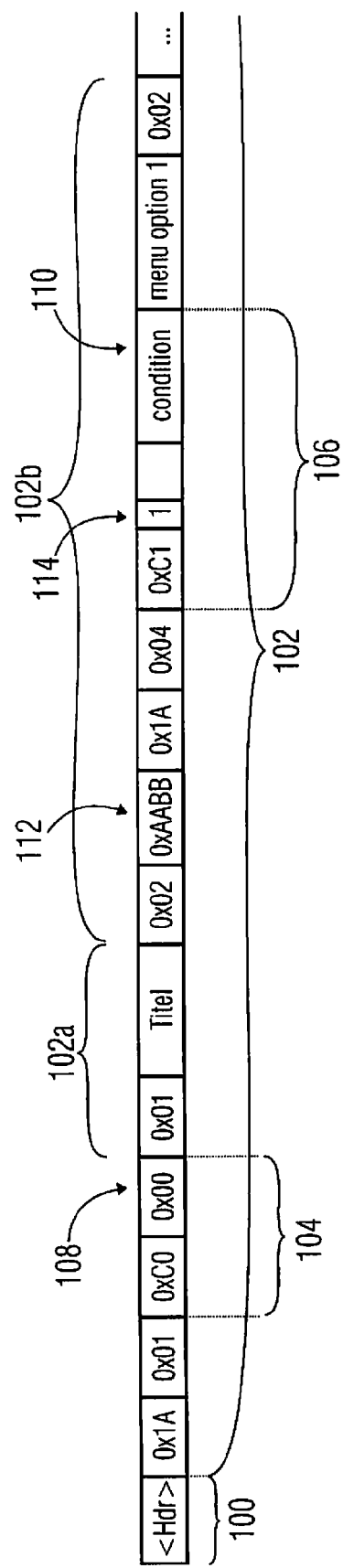
FIG. 8 shows a schematic diagram of an exemplary modification of a JML object of type menu according to an embodiment.

In order to ease the understanding of the above-outlined DS type symbols and the following description thereof, reference will be made to FIG. 8, which shows a JML selection object. As already outlined above, a JML object comprises a header section 100 followed by a content section 102. The header section comprises the object ID (see 28a in FIG. 3) and the object type symbol which is, as denoted above, for a selection object equal to the object ID of a menu object, i.e. 001. The content section 102 is serially divided-up or structured into a sequence of logical blocks. In case of menu objects, this is a title block 102a and one or more link items 102b. The JML codes indicating the beginning of a respective block 102a and 102b are 8 bit codes from 0x00 to 0x0F inclusively. In FIG. 8, 0x01 signals the beginning of the title block 102a and 0x02 indicates the beginning of a link/menu item 102b. As indicated at the end of the fragment of the object illustrated in FIG. 8, more than one menu item may be concatenated. The receivers may be supposed to or may be configured to adopt the order the menu items are arranged within the menu object when displaying the menu to the user (in the absence of any automatic-handling actions as described with respect to steps 94 and 100).

As is shown in FIG. 8, both blocks 102a and 102b comprise a respective text character portion. In FIG. 8, this portion is indicated by "title" in case of the title block 102a and "menu option 1" in case of menu item 102b. Additionally, each menu item JML code 0x02 is immediately followed by two bytes representing the pointer (30 in FIG. 3), i.e. the object ID to be visited upon selection of the respective menu item by the user. In FIG. 8, the object ID of the target JML object of the menu item 102b exemplarily is 0xAABB.

However, as the menu object shown in FIG. 8 is a selection object, additional data sections concerning the automatic handling are inserted into the menu object by use of the aforementioned escape sequences 0x1A, namely data sections 104 and 106. As already described above, the data sections are embedded in to the object by means of escape symbols, namely an escape symbol 0x1A followed by a length indication of 1 byte, namely 0x01 in case of data section 104 and 0x04 in case of data section 106. Within each data section, the aforementioned DS type symbols 0xC0 and 0xC1 occur at the beginning with additional data following which is described in more detail below.

The data section "selection object" 104 has the following structure and content. The presence of a data section 104 with DS type value 0xC0 within a menu object indicates that this menu object supports automatic handling including automatic selection of one of its link items 102b if supported by the receiver. It also defines the selection type, i.e. whether this automatic selection is based on language or any other condition type as already indicated above.

Exactly one selection criterion may be applied to one menu object. The DS data section "selection object" has the following format succeeding its indication symbol 0xC0. In particular, a selection type indicator of 8 bits follows symbol 0xC0. In the exemplarily case of FIG. 8, this is 0x00. In particular, the selection type indicator 108 of 8 bits defines the type of the selection object and the selection criterion, respectively. For example, the selection type 0x00 may describe the selection criterion "language". That is, the menu item 102b of the current menu object is available in multiple languages and the receiver may chose menu items of an advantageous language.

Of course, other values may be used for other selection type definitions.

The data section "selection marker" 106, namely its structure and content, is described in the following. The data section DS type value 0xC1 defines a selection condition for a link item 102b. It permits the selection of link 102b based on a condition value 110. Receivers that support the automatic handling mechanism are expected to match each condition 110 of each link item 102b against actual conditions, such as time and date or an own stored data set, such as a language setting and receiver version number, respectively, as described above and as will be exemplified below with respect to language. As also described above, in case of a match, the automatic handling mechanism may cause the selected link item to be selected or handled automatically without presenting the menu object to the user. Optionally, additional bytes may be comprised by the DS selection marker depending on the condition or depending on the condition type.

The DS type "selection marker" 106 may be restricted to a portion within a link item 102b of a selection object located between the link target definition 112 and the first visual text character for the link item (see menu option 1 in FIG. 8). The selection object carries 0, 1 or multiple selection conditions 106 per link item.

The DS data section "selection marker" may have the following format. A default flag 114 of one bit is used for signaling the default selection described with respect to FIG. 7 regarding steps 90 and 94. Several bytes or n×8 bits are used to define the selection condition 110. To obtain byte alignment, 7 bits may be reserved for future application.

The default flag 114 indicates whether the receiver should select the respective link item 102b if no other condition within the selection object matches or if the receiver does not understand the selection type 108. If none of the selection markers 106 within the menu has the default flag set to 1, the receiver cannot not automatically decide which selection to make and, therefore, may present the menu to the user as a regular menu object for manual selection (see step 92 in FIG. 7).

If the flag, however, is set to 1, as it is exemplified in FIG. 8, this indicates a default choice for the selection object (compare step 94 of FIG. 7). If it is set to 0 for all link items 102b, no default is signaled for the selection object. If it is set to 1 for exactly one link item, the receiver may automatically select same in case no condition data is fulfilled or the selection type is not supported, or may present the menu with individually handling the default link item as described above with respect to FIG. 7. If it is set to 1 for more than one link item, the receiver may, in case no condition data is fulfilled or the selection type is not supported, present the menu with handling the default link items differently from the others as described above with respect to FIG. 7.

With regard to the default flags within one selection object, the number of such selection markers with its default flag set to 1 could be restricted to 1 at maximum within one selection object.

The field 110 reserved for defining the selection condition could have a length which, in turn, depends on the selection type 108 of the selection object. For example, the aforementioned selection type value 0x00 indicating the language as the selection type, could have associated therewith a selection criteria length of 24 bits or 3 bytes, respectively.

The code used to identify the language could be the three-letter ISO language code as defined in ISO 639-2 (codes for the representation of names of languages—Part 2: Alpha-3 code) defined in lowercase characters. If the language code is equal to the receiver's preferences, the condition is fulfilled.

If the receiver detects the selection object data section 104 and the selection type value 108 is known, the behavior of a receiver receiving selection object of FIG. 8 could be as follows:

1. Go through all link items 102b and check if at least one of the conditions 110 given for this link item 102b is fulfilled (similar to determination in step 96 of FIG. 7). In this regard, link items without a selection marker data section could be handled as if their condition would be fulfilled. The opposite could also be true. Further, both options could be used for different automatic handling supporting objects depending on the selection type.
2. Count the link items 102b with fulfilled condition.
   a. If there is only one, then select that data link or present the textual content of the object with presenting this link item differing from the others (compare steps 98 and 94 in FIG. 7).
   b. If there are more matching link items, then present the menu items with presenting the matching ones differently from the other link items to the user for manual selection (compare step 100).
3. If there are no link items with fulfilled conditions (no-exit of step 96 in FIG. 7) and
   a) exactly one of the link items has its default flag set to 1 within a selection marker DS (compare yes-exit of step 90 in FIG. 7), select this link or present the textual content of the object with presenting this default link item differing from the others,
   b) more than one of the link items has its default flag set to 1 within a selection marker DS (compare yes-exit of step 90 in FIG. 7), present the textual content of the object with presenting these default link items differing from the others.
4. If there are no link items with fulfilled conditions and there is no link item with its default flag set to 1 within a selection market DS, present the complete menu to the user for manual selection (compare step 92 of FIG. 7).

If the receiver does not support the specific selection type value, the behavior of the receiver could be as follows:
1. Check all link items for the presence of a default flag set to 1 within a selection marker DS.
   a. If there is one, select the link item with the default flag set to 1 or present the textual content of the object with presenting this default link item differing from the others (compare step 94 in FIG. 7).
   b. If there is more than one, present the textual content of the object with presenting these default link items differing from the others (compare step 100 in FIG. 7).
   c. If there is none, present the menu to the user for manual selection (compare step 92 of FIG. 7).

As a fallback, if a receiver does not support the automatic handling mechanism at all, the menu could be presented as a regular menu to the user as it was outlined before with respect to FIG. 7 (see step 86).

The broadcaster may decide whether there should be an automatic handling by assigning a default link item through the default flag. Receivers that can handle automatic handling may not include menu objects where the link has been selected automatically in their history and hide these objects from the user, if possible.

It should be noted that, as already indicated above, the condition type is not restricted to language and also not to the examples indicated above. For example, the condition type could relate to a category of data, which the textual content of the objects referred to by that menu item belong to. For example, an automatically-handling supporting menu object could contain the menu items news, sports and economy. The receiver could have stored the user-settable user preferences indicating user-preferred categories. As to whether a condition data relating to a category is fulfilled or not, is then determined by comparing this condition data with the category preferences stored in the receiver. Moreover, the stored category preferences could not only indicate categories, which the user is interested in or not, but the category preferences could also bring the categories into a preference order by assigning values to the individual category. For example, all categories having associated therewith a value greater than zero in the category preferences could be displayed in step 100, for example with, however, ordering the menu items according to their preference values, i.e. by listing menu items having condition data referring to higher preference values first and then the menu item having associated therewith condition data indicating categories for which the category preferences indicate a lower value. For example, a user could assign a value of 100 to economy, a value of 50 to news and a value of zero for sports. Thus, the value item "sports" would not be displayed and the menu item "economy" would be displayed before the menu item "news". It is noted that this order is independent from the order at which the menu items occur in the menu object.

Further, it is noted that the procedure according to FIG. 7 and according to the description of FIG. 8 with regard to the automatic handling is only one exemplified possibility. For example, it would be possible for the receiver to choose the target object ID of the menu item, the condition data of which is fulfilled firstly when scanning the menu items in their order in which they are arranged in the menu object.

In addition, as denoted above, it is possible that processor 42 suppresses entering the object IDs of automatically-handling supporting menu objects into the history path stored in memory 50 in cases where same have not been displayed by the user, but have been subjected to automatic selection. By this manner, the automatic selection is transparent for the user and the navigation through the object tree and, in particular, the return feature maintains logical for the user.

Further, in the above embodiments, condition data was present in automatic handling supporting objects. Alternatively, merely default functionality is used. Further, the differentiation between one matching or default link item being present or more than one may be omitted. Accordingly, the automatic handling may not comprise the automatic selection but merely the automatic handling type rendering. The opposite may also be true.

Depending on an actual implementation, the inventive broadcast concept can be implemented in hardware or in software. Therefore, the present invention also relates to a computer program, which can be stored on a computer-readable medium such as a CD, a disk, DVD, a memory stick, a memory card or a memory chip. The present invention is, therefore, also a computer program having a program code which, when executed on a computer, performs the inventive method described in connection with the above figures.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

Furthermore, it is noted that all steps indicated in the flow diagrams are implemented by respective means in the receiver, and that the implementations may comprise subroutines running on a CPU, circuit parts of an ASIC or the like.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Receiver for a text-based information signal carrying text-based information content being divided onto information objects, wherein the receiver is a broadcast receiver and the text-based information signal is a data carousel text-based information broadcast signal in which the information objects are broadcasted in a data carousel manner, the receiver comprising:
   a user-operable selector; and
   a processor configured to analyze an information object comprising a selected object ID among a plurality of unique object IDs, by
      determining as to whether the information object analyzed is an automatic-handling supporting link object comprising link items pointing to other object IDs among the plurality of unique object IDs;
      if so, checking as to whether condition data associated with the link items of the automatic-handling supporting link object is fulfilled; and
      automatically appointing an object ID referred to by a link item of the automatic-handling supporting link object comprising condition data associated therewith which is fulfilled, as a newly-selected object ID or rendering a presentation to be presented to the user, representing the automatic-handling supporting link object in a way depending on the check and appointing an object ID referred to by a link item of the automatic-handling supporting link object selected by the user via the user-operable selector, as the newly-selected object ID.

2. Receiver according to claim 1, further comprising a presentation unit configured to visually and/or auditory present to the user, the presentation to be presented.

3. Receiver according to claim 1, wherein the processor is further configured to, in analyzing the information object comprising the selected object ID, determine whether the information object analyzed is an automatic-handling supporting link object by determining as to whether the information object analyzed is a link object, and
   if so, checking as to whether an automatic-handling indicator in the link object is present or not.

4. Receiver according to claim 3, wherein the processor is further configured to, if the information object analyzed is a link object but no automatically-handling supporting link object, render a presentation to be presented to the user, representing the link items of the link object in a predetermined way such that all link items of the link object are encompassed by the presentation.

5. Receiver according to claim 1, wherein the processor is configured to, in analyzing the information object comprising the selected object ID, check as to whether exactly one of the link items of the automatically-handling supporting link object comprises condition data associated therewith, which is fulfilled and, if so, automatically appointing an object ID referred to by the exactly one link item as the newly-selected object ID.

6. Receiver according to claim 1, wherein the processor is configured to, in analyzing the information object comprising the selected object ID, check as to whether more than one of the link objects of the automatically-handling supporting link object comprises condition data associated therewith which is fulfilled and, if so, render the presentation to be presented to the user such that same represents the more than one link items with leaving out or representing in a subordinate manner, the link items comprising associated therewith condition data not being fulfilled, or vice versa.

7. Receiver according to claim 1, wherein the processor is configured to, in checking as to whether the condition data associated with the link items is fulfilled,
   compare the condition data with one or more of a language setting of the broadcast receiver, a current date, current time, a current week day, a current position of the receiver, an audio or video channel which the receiver is currently attuned to, the receiver's display capability, the receiver's ability to determine the current position of the receiver, the receiver's ability to perform a navigation, the receiver's ability to access external data networks and the receiver's telecommunication capability.

8. Receiver according to claim 1, wherein the processor is further configured to, in rendering the presentation to be presented to the user, render the presentation according to a predetermined rule depending on the check, with the rule, in turn, being dependent on a condition type indication comprised within the automatically-handling supporting link object.

9. Receiver for a text-based information signal carrying text-based information content being divided onto information objects, comprising:
- a user-operable selector; and
- a processor configured to analyze an information object comprising a selected object ID among a plurality of unique object IDs, by
   - determining as to whether the information object analyzed is an automatic-handling supporting link object comprising link items pointing to other object IDs among the plurality of unique object IDs;
   - if the information object analyzed is a link object but no automatically-handling supporting link object, render a presentation to be presented to the user, representing the link items of the link object in a predetermined way such that all link items of the link object are encompassed by the presentation;
   - if the information object analyzed is an automatic-handling supporting link object, checking as to whether condition data associated with the link items of the automatic-handling supporting link object is fulfilled and determining whether none of the link items of the automatically-handling supporting link object has associated therewith a condition data being fulfilled; and
      - if none of the link items of the automatically-handling supporting link object has associated therewith a condition data being fulfilled, check default signaling of the link items of the automatically-handling supporting link object to determine a link object among the link objects of the automatically-handling supporting link object determined by default and automatically appointing an object ID referred to by the link item determined by default as the newly-selected object ID or rendering the presentation to be presented to the user so that the link item determined by default is easier to recognize for the user than link items of the automatically-handling supporting link object not being determined by default; and
      - if at least one of the link items of the automatically-handling supporting link object has associated therewith a condition data being fulfilled, automatically appointing an object ID referred to by a link item of the automatic-handling supporting link object comprising condition data associated therewith which is fulfilled, as a newly-selected object ID or rendering a presentation to be presented to the user, representing the automatic-handling supporting link object in a way depending on the check and appointing an object ID referred to by a link item of the automatic-handling supporting link object selected by the user via the user-operable selector, as the newly-selected object ID.

10. Receiver according to claim 9, wherein the receiver is a broadcast receiver and the text-based information signal is a data carousel text-based information broadcast signal in which the information objects are broadcasted in a data carousel manner.

11. Receiver according to claim 9, wherein the receiver is a broadcast receiver and the text-based information signal is a data carousel text-based information broadcast signal in which the information objects are broadcasted in a data carousel manner.

12. Receiver for a text-based information signal carrying text-based information content being divided onto information objects, comprising:
- a user-operable selector; and
- a processor configured to analyze an information object comprising a selected object ID among a plurality of unique object IDs, by
   - determining as to whether the information object analyzed is an automatic-handling supporting link object comprising link items pointing to other object IDs among the plurality of unique object IDs;
   - if so, checking as to whether condition data associated with the link items of the automatic-handling supporting link object is fulfilled; and
   - automatically appointing an object ID referred to by a link item of the automatic-handling supporting link object comprising condition data associated therewith which is fulfilled, as a newly-selected object ID or rendering a presentation to be presented to the user, representing the automatic-handling supporting link object in a way depending on the check and appointing an object ID referred to by a link item of the automatic-handling supporting link object selected by the user via the user-operable selector, as the newly-selected object ID,
- wherein the processor is configured to, in analyzing the information object comprising the selected object ID,
   - if the information object analyzed is an automatically-handling supporting link object, check a condition type indication within the automatically-handling supporting link object as to whether a condition type indicated thereby is supported by the broadcast receiver and,
   - if not, ignore the condition data associated with the link items of the automatically-handling supporting link object and check a default signaling of the link items of the automatically-handling supporting link object in order to determine as to whether a link item among the link items of the automatically-handling supporting link object is determined by default.

13. Receiver according to claim 12, wherein the receiver is a broadcast receiver and the text-based information signal is a data carousel text-based information broadcast signal in which the information objects are broadcasted in a data carousel manner.

14. Method for processing a text-based information signal carrying text-based information content being divided onto information objects wherein the text-based information signal is a data carousel text-based information broadcast signal in which the information objects are broadcasted in a data carousel manner, comprising:
- determining as to whether a predetermined information object comprising a selected object ID among a plurality of unique object IDs is an automatic-handling supporting link object comprising link items pointing to other object IDs among the plurality of unique object IDs;
- if so, checking as to whether condition data associated with the link items of the automatic-handling supporting link object is fulfilled; and
- automatically appointing an object ID referred to by a link item of the automatic-handling supporting link object comprising condition data associated therewith which is fulfilled, as a newly-selected object ID or rendering a presentation to be presented to the user, representing the automatic-handling supporting link object in a way depending on the check and appointing an object ID referred to by a link item of the automatic-handling supporting link object selected by the user via the user-operable selector, as the newly-selected object ID.

15. Method for processing a text-based information signal carrying text-based information content being divided onto information objects, comprising:

determining as to whether a predetermined information object comprising a selected object ID among a plurality of unique object IDs is an automatic-handling supporting link object comprising link items pointing to other object IDs among the plurality of unique object IDs;

if so, checking as to whether condition data associated with the link items of the automatic-handling supporting link object is fulfilled; and determine whether none of the link items of the automatically-handling supporting link object comprises associated therewith a condition data being fulfilled; and if so, check default signaling of the link items of the automatically-handling supporting link object to determine a link object among the link objects of the automatically-handling supporting link object determined by default and automatically appointing an object ID referred to by the link item determined by default as the newly-selected object ID or rendering the presentation to be presented to the user so that the link item determined by default is easier to recognize for the user than link items of the automatically-handling supporting link object not being determined by default if at least one of the link items of the automatically-handling supporting link object comprises associated therewith a condition data being fulfilled, automatically appointing an object ID referred to by a link item of the automatic-handling supporting link object comprising condition data associated therewith which is fulfilled, as a newly-selected object ID or rendering a presentation to be presented to the user, representing the automatic-handling supporting link object in a way depending on the check and appointing an object ID referred to by a link item of the automatic-handling supporting link object selected by the user via the user-operable selector, as the newly-selected object ID.

16. Method for processing a text-based information signal carrying text-based information content being divided onto information objects, comprising:

determining as to whether a predetermined information object comprising a selected object ID among a plurality of unique object IDs is an automatic-handling supporting link object comprising link items pointing to other object IDs among the plurality of unique object IDs;

if the information object analyzed is an automatically-handling supporting link object, checking a condition type indication within the automatically-handling supporting link object as to whether a condition type indicated thereby is supported by the broadcast receiver and, if so, checking as to whether condition data associated with the link items of the automatic-handling supporting link object is fulfilled; and automatically appointing an object ID referred to by a link item of the automatic-handling supporting link object comprising condition data associated therewith which is fulfilled, as a newly-selected object ID or rendering a presentation to be presented to the user, representing the automatic-handling supporting link object in a way depending on the check and appointing an object ID referred to by a link item of the automatic-handling supporting link object selected by the user via the user-operable selector, as the newly-selected object ID;

if not, ignoring the condition data associated with the link items of the automatically-handling supporting link object and checking a default signaling of the link items of the automatically-handling supporting link object in order to determine as to whether a link item among the link items of the automatically-handling supporting link object is determined by default.

* * * * *

UNITED STATES PATENT AND TRADEMARK OFFICE
CERTIFICATE OF CORRECTION

PATENT NO. : 8,862,626 B2
APPLICATION NO. : 13/273662
DATED : October 14, 2014
INVENTOR(S) : Christian Kellermann et al.

Page 1 of 1

It is certified that error appears in the above-identified patent and that said Letters Patent is hereby corrected as shown below:

Title page, item (73) Assignee: "Fraunhofer-Gesellschaft zur Foerderung der Angewandten Forschung E." should read -- Fraunhofer-Gesellschaft zur Foerderung der angewandten Forschung e.V. --.

Signed and Sealed this
Sixteenth Day of August, 2016

Michelle K. Lee
*Director of the United States Patent and Trademark Office*